United States Patent [19]

Hershey et al.

[11] Patent Number: 5,500,855
[45] Date of Patent: Mar. 19, 1996

[54] REALTIME EVENT CLASSIFICATION FOR A DATA COMMUNICATIONS NETWORK

[75] Inventors: Paul C. Hershey, Manassas, Va.; John G. Waclawsky, Frederick, Md.

[73] Assignee: International Business Machines Corporation, Armonk, N.Y.

[21] Appl. No.: 187,950

[22] Filed: Jan. 26, 1994

[51] Int. Cl.⁶ .................................................. H04J 3/14
[52] U.S. Cl. .................................................. 370/17
[58] Field of Search ........................... 370/13, 17, 60, 370/85.5, 94.1, 85.13, 85.15; 364/550, 580; 379/114; 340/825.06, 825.5, 825.52

[56] References Cited

U.S. PATENT DOCUMENTS

| | | | |
|---|---|---|---|
| 4,227,245 | 10/1980 | Edbland et al. | 364/468 |
| 4,458,309 | 7/1984 | Wilder, Jr. | 364/DIG. 1 |
| 4,459,656 | 7/1984 | Wilder, Jr. | 364/DIG. 1 |
| 4,521,849 | 6/1985 | Wilder, Jr. | 364/DIG. 1 |
| 4,779,194 | 10/1988 | Jennings et al. | 364/DIG. 1 |
| 4,805,089 | 2/1989 | Lane et al. | 364/188 |
| 4,851,998 | 7/1989 | Hospodor | 364/580 |
| 4,905,171 | 2/1990 | Kiel et al. | 364/551.01 |
| 4,939,724 | 7/1990 | Ebersole | 370/85.15 |
| 4,944,038 | 7/1990 | Hardy et al. | 370/85.5 |
| 4,980,824 | 12/1990 | Tulpule et al. | 364/DIG. 2 |
| 5,035,302 | 7/1991 | Thangavelu | 187/125 |
| 5,062,055 | 10/1991 | Chinnaswamy et al. | 364/DIG. 1 |
| 5,065,393 | 11/1991 | Sibbitt et al. | 379/114 |
| 5,067,107 | 11/1991 | Wade | 395/500 |
| 5,072,376 | 12/1991 | Ellsworth | 395/650 |
| 5,077,763 | 12/1991 | Gagnoud et al. | 377/16 |
| 5,079,760 | 1/1992 | Nemirovsky et al. | 370/17 |
| 5,084,871 | 1/1992 | Carn et al. | 370/94.1 |
| 5,140,588 | 8/1992 | Danner | 370/17 |
| 5,142,653 | 8/1992 | Schefts | 370/17 |
| 5,231,593 | 7/1993 | Notess | 364/550 |
| 5,243,543 | 9/1993 | Notess | 364/550 |
| 5,276,676 | 1/1994 | Horn et al. | 370/17 |
| 5,315,580 | 5/1994 | Phaal | 370/13 |
| 5,365,514 | 11/1994 | Hershey et al. | 370/17 |
| 5,375,070 | 12/1994 | Hershey et al. | 364/550 |

FOREIGN PATENT DOCUMENTS 0515296  11/1992  European Pat. Off. .
61-53855  3/1986  Japan .

Primary Examiner—Douglas W. Olms
Assistant Examiner—Chau T. Nguyen
Attorney, Agent, or Firm—Joseph C. Redmond; John E. Hoel

[57] ABSTRACT

The realtime event classification technique is described for a data communications network, which enables the categorization of data frames based upon selection significant bit segments in the serial bit stream. A base Event Driven Interface and an extension Event Driven Interface are both coupled to the data communications network, to identify patterns in the serial bit stream. The base Event Driven Interface identifies patterns which correspond to events which are to be counted. The extension Event Driven Interface identifies patterns of bits which are selection significant for the types of categories which are desired to be monitored. A plurality of event vector counters have event inputs coupled to the base Event Driven Interface and have a selection input coupled to the extension Event Driven Interface. A selection signal output from the extension Event Driven Interface enables one of the plurality of the event vector counters to receive the event signals from the base Event Driven Interface. In this manner, a variety of monitoring and analysis operations can be performed on the data communications network.

10 Claims, 3 Drawing Sheets

SEC HARDWARE ARCHITECTURE

EDI EXAMPLE - BILLING INFORMATION

EXAMPLE: CATEGORIZING BILLING INFORMATION BY THE NUMBER OF FRAMES SENT (#F) AND THE NUMBER OF BYTES SENT (BYTES) BY DEVICES IN A FOUR NODE NETWORK WHERE DEVICE ADDRESSES ARE MAPPED BY THE EDI EXTENSION TO CATEGORY LOCATIONS 0, 1, 2, AND 3 IN RAM.

SEC HARDWARE ARCHITECTURE

REALTIME EVENT CLASSIFICATION FOR A DATA COMMUNICATIONS NETWORK

BACKGROUND OF THE INVENTION

1. Technical Field

The invention disclosed broadly relates to the extraction of information from large bodies of data for high speed communication facilities, and more particularly relates to realtime event classification for a data communications network.

2. Related Patent Applications

This invention is related to the copending patent application Ser. No. 08/024,575, filed Mar. 1, 1993, now U.S. Pat. No. 5,365,514 entitled "Event Driven Interface for a System for Monitoring and Controlling a Data Communications Network," by P. C. Hershey, et al., (now U.S. Pat. No. 5,365,514 issued Nov. 15, 1994) assigned to the IBM Corporation and incorporated herein by reference.

This patent application is related to the U.S. patent application Ser. No. 08/024,572, filed Mar. 1, 1993, U.S. Pat. No. 5,375,070, entitled "Information Collection Architecture and Method for a Data Communications Network," by J. G. Waclawsky, et al., now U.S. Pat. No. 5,375,070 issued Dec. 20, 1994 assigned to the IBM Corporation and incorporated herein by reference.

This patent application is also related to the U.S. patent application Ser. No. 08/024,563, filed Mar. 1, 1993, abandoned, entitled "Event Driven Interface for a System for Monitoring and Controlling a Data Communications Network," by P. C. Hershey, et al., assigned to the IBM Corporation and incorporated herein by reference.

This patent application is also related to the U.S. patent application Ser. No. 08/024,542, filed Mar. 1, 1993, entitled "System and Method for Configuring an Event Driven Interface and Analyzing Its Output for Monitoring and Controlling a Data Communications Network," by J. G. Waclawsky, et al., assigned to the IBM Corporation and incorporated herein by reference.

This patent application is also related to the copending U.S. patent application Ser. No. 08/138,045, filed Oct. 15, 1993, entitled "System and Method for Adaptive, Active Monitoring of a Serial Data Stream Having a Characteristic Pattern," by P. C. Hershey, et al., assigned to the IBM Corporation and incorporated herein by reference.

3. Background Information

The above cited Hershey, et al. patent application describes the Event Driven Interface which is a programmed device to perform pattern recognition operations on the serial data streams in a data communications network. The Event Driven Interface categorizes various patterns identified in the serial bit stream and increments designated counters at the output at the Event Driven Interface, in accordance with a preprogrammed set of control vectors.

It would be useful to perform simultaneous network analyses and monitoring operations by capturing selection significant segments of the serial bit streams off the data communications network, thereby enabling the categorization of the counting of events based upon prespecified categories.

OBJECTS OF THE INVENTION

It is therefore an object of the invention to perform realtime event classification on a data communications network, in an improved manner.

It is another object of the invention to identify a plurality of categories of bit patterns from the serial bit stream of a data communications network, simultaneously.

SUMMARY OF THE INVENTION

These and other objects, features and advantages are accomplished by the invention disclosed herein. The invention is an extension to the Event Driven Interface concept, by augmenting the Event Driven Interface to include an additional component which identifies bit pattern segments which are significant for the selection of categories of information in the serial bit stream. In accordance with the invention, the Event Driven Interface extension will process the serial bit stream in parallel with the processing of the serial bit stream by the basic Event Driven Interface, in order to identify selection significant bit patterns. Selection significant bit patterns can include for example the identity of the source of messages on the data communications network. For each different transmitting node on the data communications network, a separate array of event vector counters can be provided. As each specific source node is identified for a given data frame, for example, a separate counter can be provided to receive the count outputs of the base Event Driven Interface. This example application would be useful for establishing billing information, for monitoring node activity, or for problem determination related to the source node in the network.

By having a plurality of event vector counters, one for each preprogrammed category whose pattern is to be identified by the EDI extension, global billing can be performed for all of the source nodes in the network. In addition, an overall network design analysis can be performed for all of the source nodes in the network. In addition, capacity planning can be performed for all of the source nodes in the network. In addition, network tuning and optimization activities can be performed using the plurality of event vector counters, in accordance with the invention.

Other types of categories into which the plurality of event vector counters can be associated includes all of the destination addresses in the data communications network, or all of the packet sizes in the data communications network, or the respective account numbers in the data packets.

Another feature of the invention is the inclusion of an activity bit which would be associated with each respective event vector counter in the plurality of counters receiving outputs from the base Event Driven Interface. The activity bit would be turned on whenever a particular counter was accessed. If the artificial intelligence analysis system making use of the event vectors, interrogates the plurality of counters on a periodic or infrequent basis, then only those event vector counters which had activity, as indicated by the activity bit being on, need be copied to the analysis program. This feature minimizes the Event Driven Interface event vector information which needs to be returned to the expert system analyzer.

Another feature of the invention is a least recently used feature for the event vector counters. If there are a limited number of event vector counters, then one way to implement a least recently used feature is to assign each counter to the top of a stack at the moment it is used or incremented. Then as a given counter ages with time, its relative priority diminishes as it proceeds down to the bottom of the stack and if the counter has no activity by the time all of the rest of the counters have been used, then that counter loses its identity.

A corollary to this feature would be the most frequently used feature where each respective event vector counter has associated with it a count of the total number of accesses that it has had during a session. The event vector counter having the most current accesses is placed at the top of a stack. There is only room for the top N counters and therefore those categories which are not as frequently counted will not have a corresponding counter available in the plurality of counters. Of course, with both the least recently used feature and with the most frequently used feature, there will be a periodic dumping of the contents of the counters to the expert system analyzer and a resetting of each respective counter so that all categories of activities in the data communications system will have an opportunity to register their counts in the plurality of event vector counters.

Another feature of this invention includes the capability to detect and classify multiple characteristic data patterns that can occur simultaneously on a communications network. These characteristic data patterns represent events of interest for network management. These events may be station specific or network specific. Examples of such events include parameters required for performance analysis, fault tolerance, and security. This invention classifies the detected events simultaneously as they occur on the wire. Therefore, realtime event classification is possible.

DESCRIPTION OF THE FIGURES

These and other objects, features and advantages will be more fully appreciated by reference to the accompanying figures.

DISCUSSION OF THE PREFERRED EMBODIMENT

The problem is how to simultaneously compile several event vectors corresponding to several types of events or categories of events using the Event Driven Interface.

Figure 1:
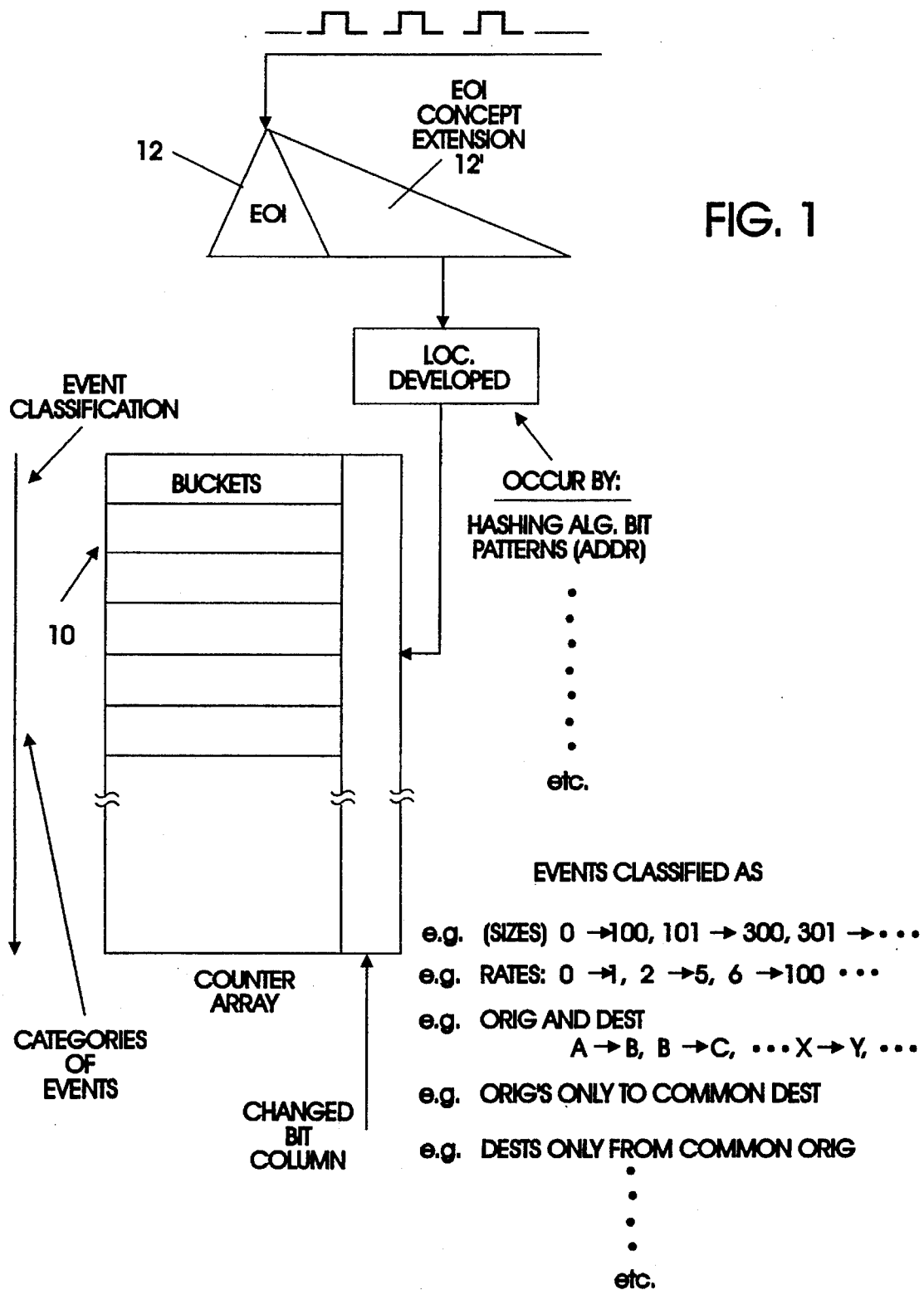
FIG. 1 is a schematic diagram of the Event Driven Interface and the Event Driven Interface extension, with a plurality of event vector counters, in accordance with the invention.

Attached is a FIG. 1 which shows a modification to the Event Driven Interface (EDI) structure, which is described in the companion the above cited patent application Ser. No. 08/024,575. The counters 10 for the EDI 12 are expanded in this invention, to have several levels of counters. Each level of counters will correspond to one event category, such as communication between a specified pair of nodes, or traffic classified as sizes, or traffic originating from a particular node, or traffic destined to a particular node, etc. Each of those categories of traffic on the network can have corresponding event vectors compiled for them in separate levels of counters as is shown in the figure.

In order to accomplish this, additional branches of the tree in EDI are provided which correspond to each respective category of events. The output of the EDI extension portion 12' is an address which enables the writing to a particular level in a multiple level of counters for each respective category of events to be recorded. In this manner, a variety of event categories can have corresponding event vectors compiled simultaneously for a network.

One feature of the system shown in the attached figure is the changed bit column which allows only those levels of counters which have had a change in their contents since the last transmission to the expert system, to be forwarded during the current monitoring interval.

Another feature of the system shown in the attached figure is the formulation of the address at the output of the extended EDI 12', which can be by a hashing algorithm FSM loaded into the EDI to work off patterns in the bit stream or by another form of bit pattern generation which will provide a more efficient addressing technique for addressing a relatively sparse matrix of data in the layers of counters 10, addressing algorithms to particular counter levels.

Still another feature of this system in the attached figure is the provision of a least recently used indication for respective layers of counters, so that after an extended period of monitoring, only those counters which have had the highest corresponding measured activity, will be recognized and forwarded to the expert system.

Figure 2:
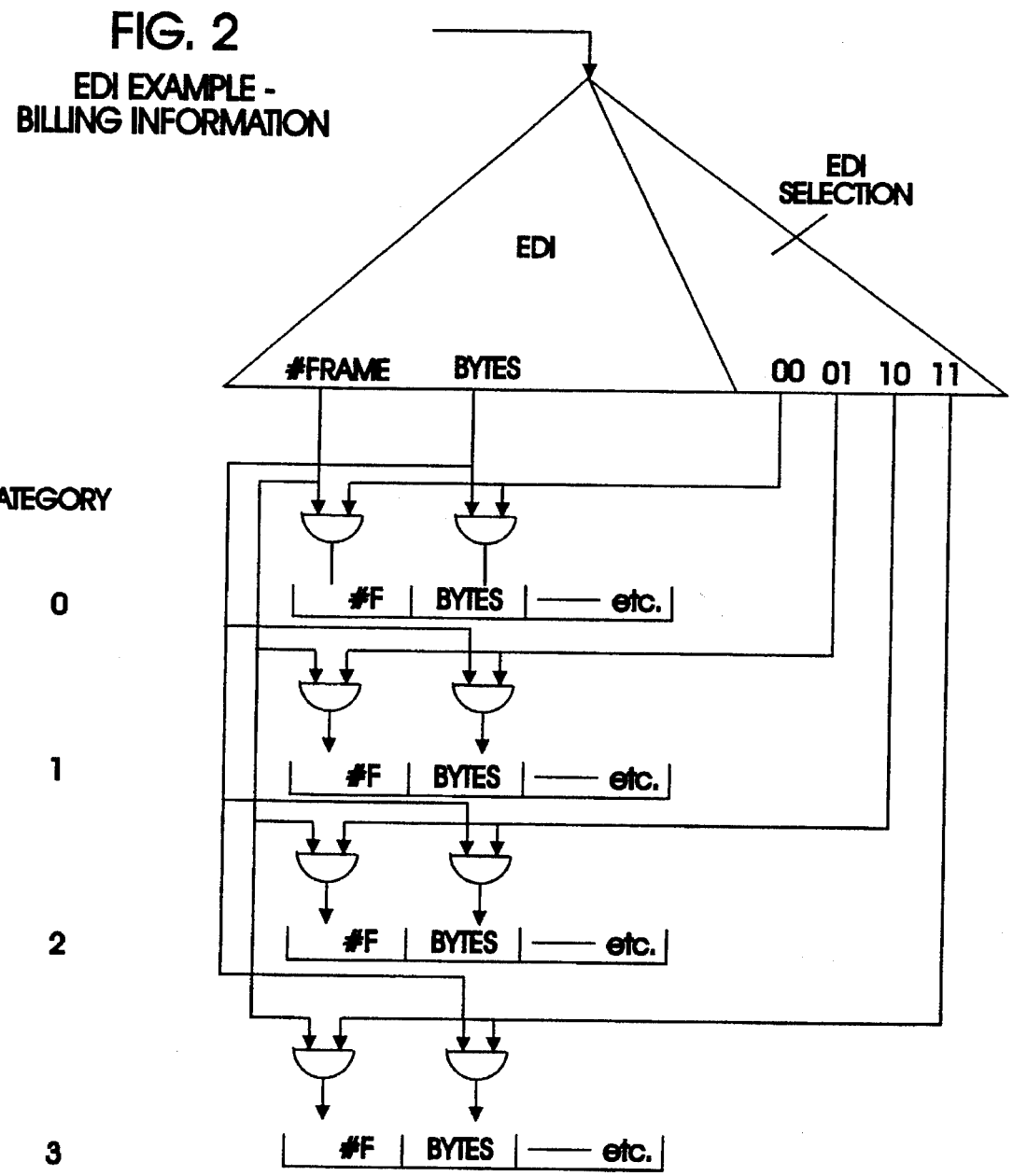
FIG. 2 illustrates a more detailed diagram of the base Event Driven Interface and the extension Event Driven Interface, for an example of categorizing billing information for a plurality of source nodes in the data communications network.

FIG. 2 illustrates an example of the base Event Driven Interface and the extension Event Driven Interface used in categorizing billing information by the number of frames sent (number F) and the number of bytes sent in each frame (bytes) by devices in a four node network. In this example, device addresses for the source nodes are mapped by the extension Event Driven Interface into four category locations 0, 1, 2 and 3 in the random access memory.

Still another feature of this system is simultaneous event classification. Simultaneous event classification (SEC) refers to the collection of two of more events during the same measurement time interval for individual network station addresses. A measurement time interval (MTI) is defined as the period of time over which data is collected. Examples include collecting separate performance data for each node within a given communication network (i.e., frame count F{1} originated from node 1 and frame count F{2} originated from node 2). The event F_{i}, in this case, would correspond node address i that is identified by the source or destination address field of the frame format of the protocol. This example applies to communications protocols such as FDDI [1], FDDI-2 [2], token ring [3], DQDB [4], token bus [5], and CSMA/CD [6].

Consider the example of a 16 Mbps IEEE 802.5 token ring network. A single token ring network can have at most 250 attached stations. The ICA device as previously disclosed can collect data for a network with 250 attached stations and can compute a performance measure for the overall network. However, this ICA device does not distinguish between individual stations. Herein we extend the ICA methodology to classify events by their source or destination address. Thereby, the ICA can collect performance data for each individual station in addition to collecting data for the network as a whole. Important applications for such an extension include billing, fault isolation, and security.

Figure 3:
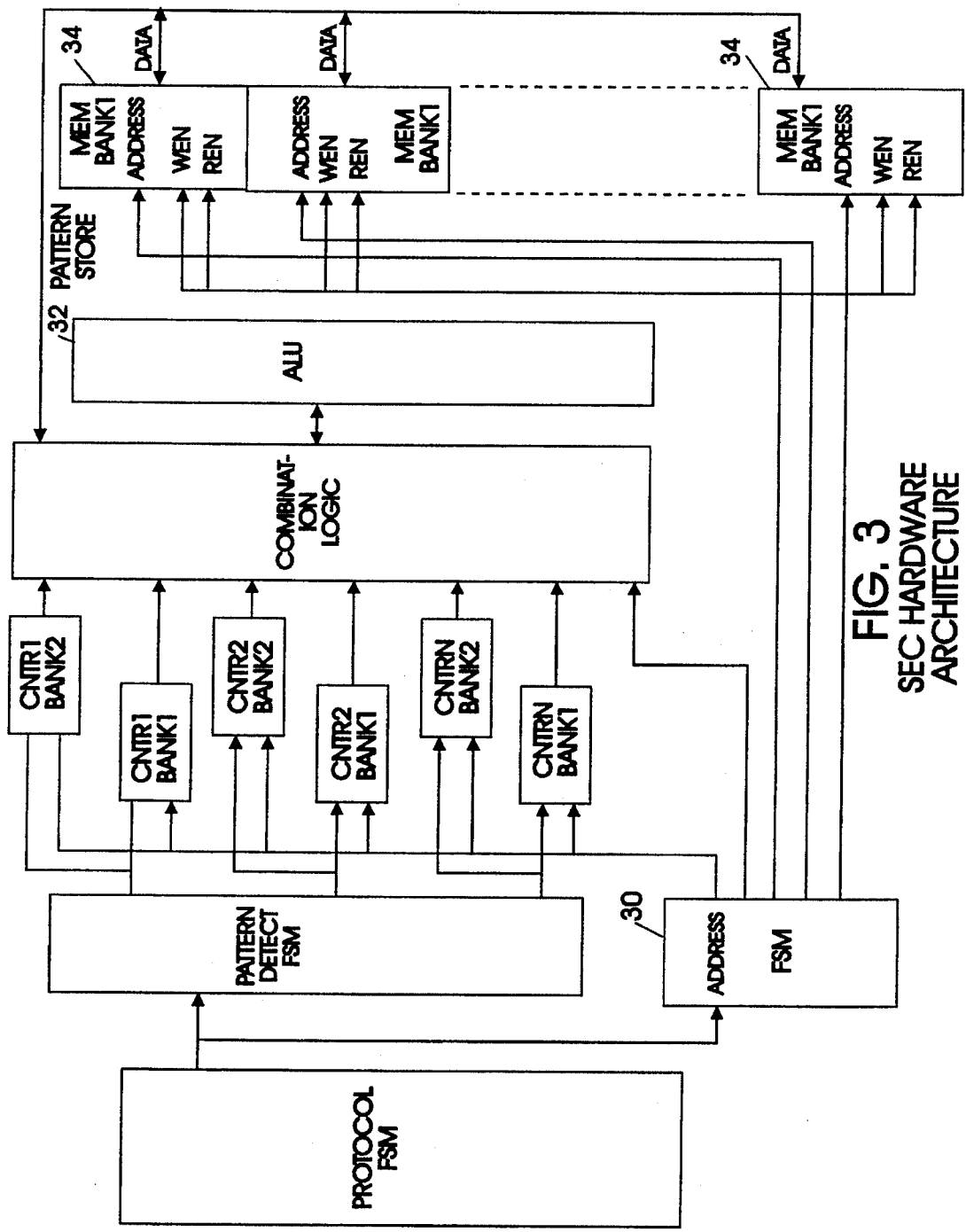
FIG. 3 illustrates a hardware architecture for simultaneous event classification.

A hardware architecture for SEC appears in FIG. 3. This architecture differs from that previously disclosed. The protocol, pattern recognition FSMs, and the first bank of counters operate exactly as described in above cited patent application Ser. No. 08/024,563 and the copending U.S. patent application entitled "Realtime Addressing for High Speed Serial Bit Stream" by P. C. Hershey, et al., Ser. No. 08/188,167, filed Jan. 26, 1994 on the same day as this application. We enhance this architecture by adding an address finite state machine (FSM) 30, an arithmetic logic unit (ALU) 32, a Pattern Store memory 34, and a second bank of counters. The address FSM recognizes source and/or destination addresses using the same RAM lookup table procedure described in the two above cited copending patent applications for pattern recognition. When a particular address is recognized, the address FSM produces an output symbol that serves as an enable to a specific bank (or region) of Pattern Store memory. This memory region is specifically dedicated to storing performance parameters detected for only that address. The Pattern Store memory map is dynamically reprogrammable. When the next address becomes active, the address FSM enables a different region in Pattern Store memory so that performance parameters specific to that address can be stored there. If the original address is detected again, the Pattern Store memory outputs the stored parameter counts for that address to the ALU. When a different address is recognized by the address FSM, the contents of the active counter bank is dumped to the ALU where the counts for the performance parameters are added to those previously accumulated. After the addition, the contents of the ALU are again stored in the Pattern Store until the address is recognized again. At the end of the time interval, the contents of the Pattern Store memory are dumped to the performance FSM for analysis. We provide two banks of counters in order to maintain realtime counting. Otherwise, during the time when the counters are dumping to the ALU, we would have to stop counting new parameters. We alternate between counter banks when addresses change. The address FSM detects this changes and controls the switching between counter banks.

For a single token ring network, a maximum of 250 stations can be active. Therefore, this architecture would require 250 memory partitions. Present technology includes 10 ns access time static RAMs organized as 256K by 16. Therefore, we would have 1K locations per address to store parameters values. This is more than adequate to store parameter counts for any of the performance measures identified herein.

The actual procedure to handle the changing set of addresses could be a hashing algorithm described in A. V. Aho, J. E. Hopcroft, J. D. Ullman, "Principles and Practice of the Design and Analysis of Computer Algorithms," Addison-Wesley, Reading, Mass. 1974. Aho et al. provides such a hashing scheme. This algorithm permits the mapping of elements from a universal set (e.g. the set of station addresses) to Pattern Store memory blocks 0 through M-1, where M=256 for our example. Aho shows that the computational complexity to insert n new addresses is order n (e.g., O(n)). Because the number of station addresses is unknown for a given data collection time interval, we must construct a number of different hash tables $T\_\{0\}, T\_\{1\}, T\_\{2\}, \ldots$, and initially pick one of suitable size. If the number of station addresses exceeds M, we reconfigure the Pattern Store memory with a new hash table of depth 2M and rehash the elements of the original hash table to the new hash table. Alternative hashing algorithms specifically for address lookup in computer networks are presented by R. Jain, "A Comparison of Hashing Schemes for Address Lookup in Computer Networks," *IEEE Trans. Commun*, Vol. 40, No. 10, October 1992, pp. 1570–1573.

This new architecture can be extended to multiple networks by using the ICA at a bridge, router, or hub. For these cases the number of addresses will increase; however, the number of recognizable performance parameters is less do to limited visibility to the data stream for these devices as compared with a station on the network.

Although a specific embodiment of the invention has been disclosed, it will be understood by those having skill in the art that changes can be made to that specific embodiment without departing from the spirit and the scope of the invention.

What is claimed is:

1. In a system for monitoring and controlling a data communications network which communicates a serial stream of binary bits having a characteristic pattern, comprising:

a base Event Driven Interface having an input coupled to said data communications network, programmed to process the serial stream and identify event bit patterns in said serial bit stream whose occurrence is an event to be counted, for outputting an event signal in response to identifying and selecting an event bit pattern;

an extension Event Driven Interface having an input coupled to said data communications network, programmed to process the serial data stream simultaneously and in parallel with the event driven interface to identify category bit patterns in said serial bit stream, which are significant bit patterns for one of a plurality of categories of data frames in said serial bit stream, for outputting a selection signal in response to identifying a one category bit pattern;

a plurality of event vector counters in levels, each level corresponding to a respective one of said plurality of categories, each counter thereof having an event input selectively coupled to said output of said base Event Driven Interface, for receiving said event signal, and each counter having a selection input coupled to said output of said extension Event Driven Interface, for enabling the counter to receive said event signal in response to said selection signal.

2. The apparatus of claim 1 wherein each counter in said plurality of event vector counters, include an activity bit field which is incremented to show that such counter had been recently used when such counter was accessed by the event signal;

whereby only those recently accessed counters of said plurality of event vector counters need be output to a utilization device.

3. The apparatus of claim 1 wherein:

said plurality of event vector counters comprises a stacked register of most recent events counted for categories;

whereby those recently accessed categories having the most recent events are only counted in said plurality of counters.

4. The apparatus of claim 1 wherein:

said plurality of counters comprises a stacked register of most recent events counted for categories;

whereby those categories of the events which occur most frequently, are only counted in said plurality of counters.

5. The apparatus of claim 1 wherein said plurality of categories are the identities of the source nodes in said data communications network.

6. The apparatus of claim 1 wherein said plurality of categories are the destination nodes in said data communications network.

7. A method for monitoring and controlling a data communications network which communicates a serial stream of binary bits having a characteristic pattern, the network coupled to a programmable event driven interface including an extension portion, comprising the steps of:

a) identifying in the event driven interface significant bit patterns representative of different traffic events on the network;

b) simultaneously and in parallel with the event driven interface, identifying in the event driven interface extension selection significant bit patterns in the identified discrete patterns;

c) incrementing counters for the identified significant bit patterns in accordance with a preprogrammed set of control vectors;

d) collecting selection significant bit patterns in the event driven interface extension outputted from the event driven interface; and e) incrementing counters for the selection significant bit patterns from the outputted significant bit patterns furnished by the event driven interface whereby categorization of traffic patterns is achieved for real-time monitoring and control of the data communications network.

8. In a system for monitoring and controlling a data communications network which communicates a serial stream of binary bits having a characteristic pattern, comprising:

a) a finite state machine coupled to the network for receiving the serial bit stream and providing an output;

b) a pattern detect finite state machine and an address finite state machine coupled to the finite state machine for receiving the finite state machine output and providing an event and address signals;

c) a combination logic unit and interface coupled to the pattern detect finite state machine and to the address finite state machine for receiving the address signals and the event signals as outputs;

d) an arithmetic logic unit coupled to the combination logic interface for receiving an event count for each traffic event counted; and e) a pattern store memory coupled to the address finite state machine and the combination logic unit interface for receiving the address signal and providing an output to the combination logic unit for counting purposes;

whereby the serial stream of data can be monitored and controlled for the network as a whole and for each station in the network.

9. The system of claim 8 wherein the pattern detect finite state machine is re-programmable.

10. The system of claim 9 wherein when the address finite state machine recognizes a particular address in the serial stream of binary bits an output signal is provided by the address finite state machine to enable a specific bank or region of the pattern store memory and if the address is detected again the pattern store memory outputs a stored parameter count to the arithmetic logic unit for updating the address detected again in the pattern store memory by way of the combination logic unit.

* * * * *